(12) United States Patent
Knittle (10) Patent No.: US 9,264,141 B2
(45) Date of Patent: Feb. 16, 2016

(54) MULTI-DOMAIN SCHEDULING FOR SUBORDINATE NETWORKING

(71) Applicant: Cable Television Laboratories, Inc., Louisville, CO (US)

(72) Inventor: Curtis Knittle, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 14/245,412

(22) Filed: Apr. 4, 2014

(65) Prior Publication Data

US 2015/0162985 A1    Jun. 11, 2015

Related U.S. Application Data

(60) Provisional application No. 61/912,773, filed on Dec. 6, 2013.

(51) Int. Cl.
*H04B 10/27* (2013.01)

(52) U.S. Cl.
CPC ..................................... *H04B 10/27* (2013.01)

(58) Field of Classification Search
CPC ... H04Q 11/0067; H04L 12/413; H04B 10/27
See application file for complete search history.

(56) References Cited

U.S. PATENT DOCUMENTS

| | | | |
|---|---|---|---|
| 2013/0315595 A1* | 11/2013 | Barr | 398/67 |
| 2013/0343754 A1* | 12/2013 | Shellhammer et al. | 398/43 |
| 2014/0304500 A1* | 10/2014 | Sun et al. | 713/153 |
| 2015/0089047 A1* | 3/2015 | Matthews et al. | 709/224 |
| 2015/0093108 A1* | 4/2015 | Hirth et al. | 398/34 |

* cited by examiner

*Primary Examiner* — Shi K Li
*Assistant Examiner* — Mina Shalaby
(74) *Attorney, Agent, or Firm* — Great Lakes Intellectual Property, PLLC (57) ABSTRACT

Multi-domain scheduling for subordinate networking is contemplated. The scheduling may include controlling a terminal to facilitate interfacing an Internet Protocol (IP) network with a point-to-multipoint (P2MP) network where the P2MP network includes one or more aggregating devices to facilitate interfacing signaling with devices/units associated with one or more subordinate P2MP networks.

20 Claims, 5 Drawing Sheets

MULTI-DOMAIN SCHEDULING FOR SUBORDINATE NETWORKING

CROSS-REFERENCE TO RELATED APPLICATIONS

This application claims the benefit of U.S. provisional Application No. 61/912,773 filed Dec. 6, 2013, the disclosure of which is incorporated in its entirety by reference herein.

TECHNICAL FIELD

The present invention relates to scheduling and/or dynamic bandwidth allocation within networks, such as but not necessary limited to facilitating multi-domain scheduling for subordinate networks.

BACKGROUND

A point-to-multipoint (P2MP) network may be defined as one that relies upon multiple paths communications to facilitate interfacing a single terminal with a plurality of secondary units. A P2MP network may require scheduling and/or dynamic bandwidth allocation capabilities in order to properly regulate the multi-path signaling. When multiple subordinate or cascaded P2MP networks are associated with another, primary P2MP network, the scheduling and/or dynamic bandwidth allocation can become more complex with the additional subordinate P2MP networks increasing the number of secondary units potentially desiring to communicate over the common, primary P2MP network. One non-limiting aspect of the present invention contemplates facilitating scheduling and/or dynamic bandwidth allocation in such an arrangement so as to ameliorate latency and jitter associated with facilitating signaling across the primary and subordinate P2MP networks.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
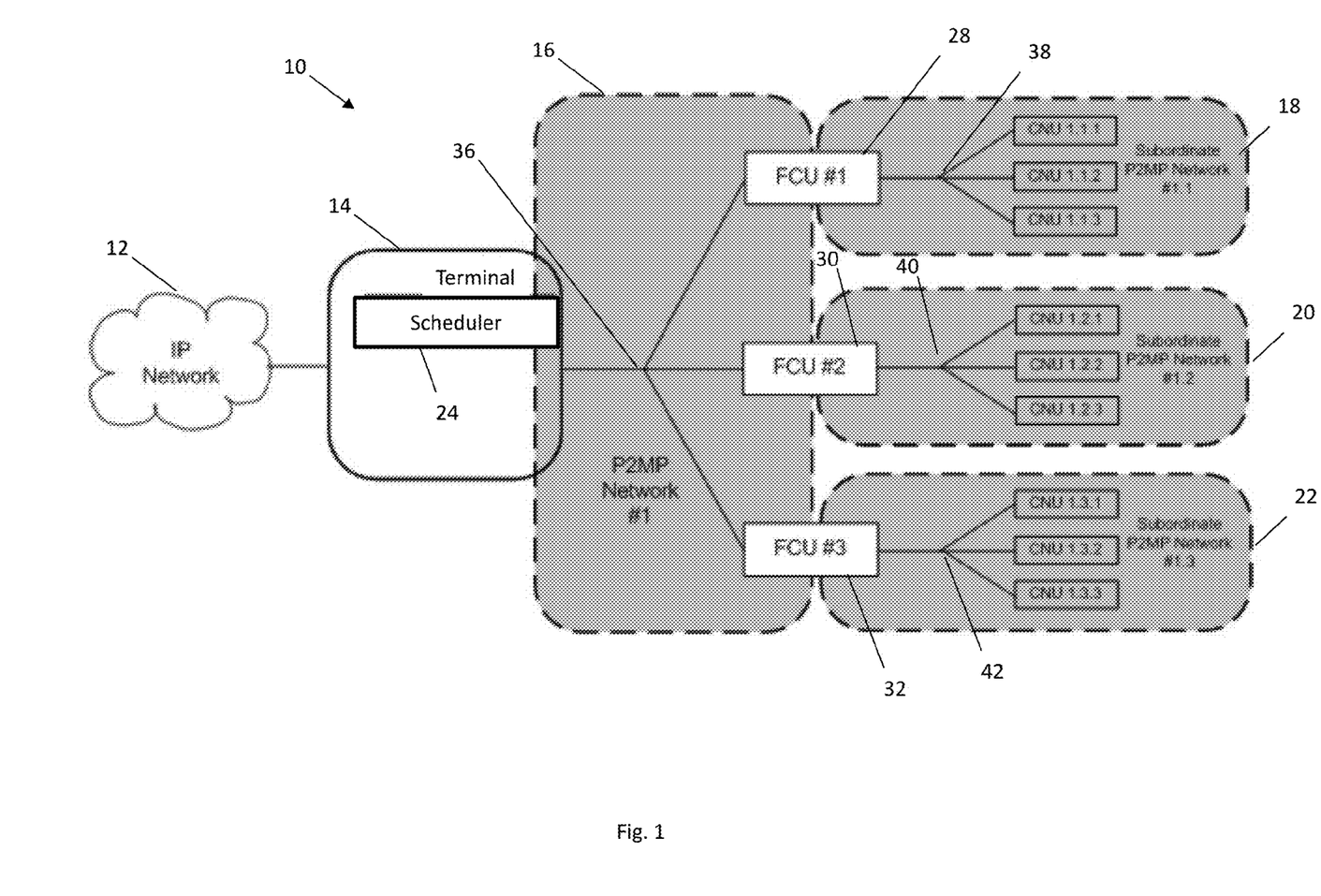
FIG. 1 illustrates a system in accordance with one non-limiting aspect of the present invention.

FIG. 1 illustrates a system 10 in accordance with one non-limiting aspect of the present invention. The system 10 is shown to include an Internet Protocol (IP) network 12, a terminal 14, a primary point-to-multipoint (P2MP) network 16 and a plurality of subordinate P2MP networks 18, 20, 22. The terminal 14 or other device associated with the system 10 may include a scheduler 24 configured to facilitate the multi-domain scheduling contemplated herein. The multi-domain scheduling may be utilized to facilitate regulating signaling carried over multiple paths within each of the primary and subordinate P2MP networks 16, 18, 20, 22 for single path communication over the same, i.e., multi-path signaling carried over the subordinate P2MP networks 18, 20, 22 may be regulated for single path communication with a corresponding aggregating device 28, 30, 32 and multipath signaling carried over the primary P2MP network 16 may be regulated for single path communication with the terminal 14. The scheduler 24 may be configured to facilitate controlling the one-to-many signaling such that data originating from units (1.1.1, 1.1.2, etc.) within the subordinate P2MP networks 18, 20, 22 arrive at the terminal without conflict or collision.

The terminal 14 is shown to facilitate interfacing signaling between the IP network 12 and the primary P2MP network 16 for exemplary non-limiting purposes as the terminal 14 may be configured to facilitate interfacing signals with networks other than the IP network 12. The IP network 12 is shown to demonstrate one use of the present invention where the terminal 14 facilitates interfacing signaling for transport over the Internet or other IP dependent network. The primary P2MP network 16 may rely upon optical signaling to facilitate communications with the terminal and aggregating devices configured as fiber cable units (FCUs) 28, 30, 32 to facilitate non-optical, wireless and/or wireline communications with the units. The units may be characterized as cable network units (CNUs) in the event the subordinate P2MP networks 18, 20, 22 are hybrid fiber-coax (HFC) networks operating according to Data-Over-Cable Service Interface Specifications DOCSIS 3.1: Physical Layer Specification CM-SP-PHYv3.1401-131029 and/or U.S. patent application Ser. No. 14/181,640, entitled Multiple-Input Multiple-Output (MIMO) Communication System, the disclosures of which are hereby incorporated by reference in their entireties.

The illustration of optical signaling over the primary P2MP network 16 and non-optical signaling over the subordinate P2MP networks 18, 20, 22 is shown to demonstrate one use of the present invention to facilitate Ethernet Passive Optical Network (EPON) Protocol over Coax (EPoC) where EPON is utilized over the primary P2MP network 16 and DOCSIS or other non-optical communications are utilized over the subordinate P2MP networks 18, 20, 22. The capability of the present invention to facilitate scheduling for systems employing EPoC, EPON, PON or other P2MP type of protocols may be particularly beneficial in enabling scheduling and/or dynamic bandwidth allocation in the manner described in more detail below so as to minimize latency and jitter. While these at least partially optically-based standards and protocols are referenced, the present invention is not necessarily so limited and fully contemplates its use and application in facilitating scheduling and/or dynamic bandwidth allocation in other types of environments that may or may not employ such optical or partially optically dependent control methodologies. In particular, the present invention fully contemplates its use in an all cable scenario where both of the P2MP network 16 and the subordinate P2MP networks 18, 20, 22 are cable-based networks or HFC networks and/or in a wireless or combined wireless where one or both of the primary and subordinate P2MP networks 16, 18, 20, 22 facilitate wireless signaling.

The terminal 14 is described with respect to interfacing signals between the primary P2MP network 16 and the IP network 12 or other outside or wide area (WAN) network. The terminal 14 may be any device had capabilities sufficient to facilitate terminating P2MP communications or other one-to-many signaling, such as but not necessary limited to being an optical line terminal (OLT) operable with EPON and/or EPoC deployments. The aggregating devices or FCUs 28, 30, 32 may be any device having capabilities sufficient to facilitate interfacing signaling between the primary and subordinate P2MP networks 16, 18, 20, 22. The units are principally referred to as CNUs due to the corresponding communications being carried over a co-wax or other wireline communication medium but the CNUs may be any other device sufficient to facilitate interfacing signals rather information with customer premise equipment (CPE), such as but not necessary limited to optical network units (ONUs) or Wi-Fi access points. One or more splitters 36, 38, 40, 42 may be included within each of the primary and subordinate P2MP networks 16, 18, 20, 22 to facilitate combining the multiple path communications. The splitters 36, 38, 40, 42 may be passive and/or unpowered devices configured to replicate downstream traveling signals to each of the multiple paths and to combine upstream traveling signals to a corresponding single path. Optionally, the splitters 36, 38, 40, 42 may be active devices or devices having capabilities sufficient to actively control the paths to which signals are passed. In the illustrated configuration, a first splitter 36 may be an optical splitter and a second, third in splitter 38, 40, 42 may be non-optical splitters.

Figure 2A:
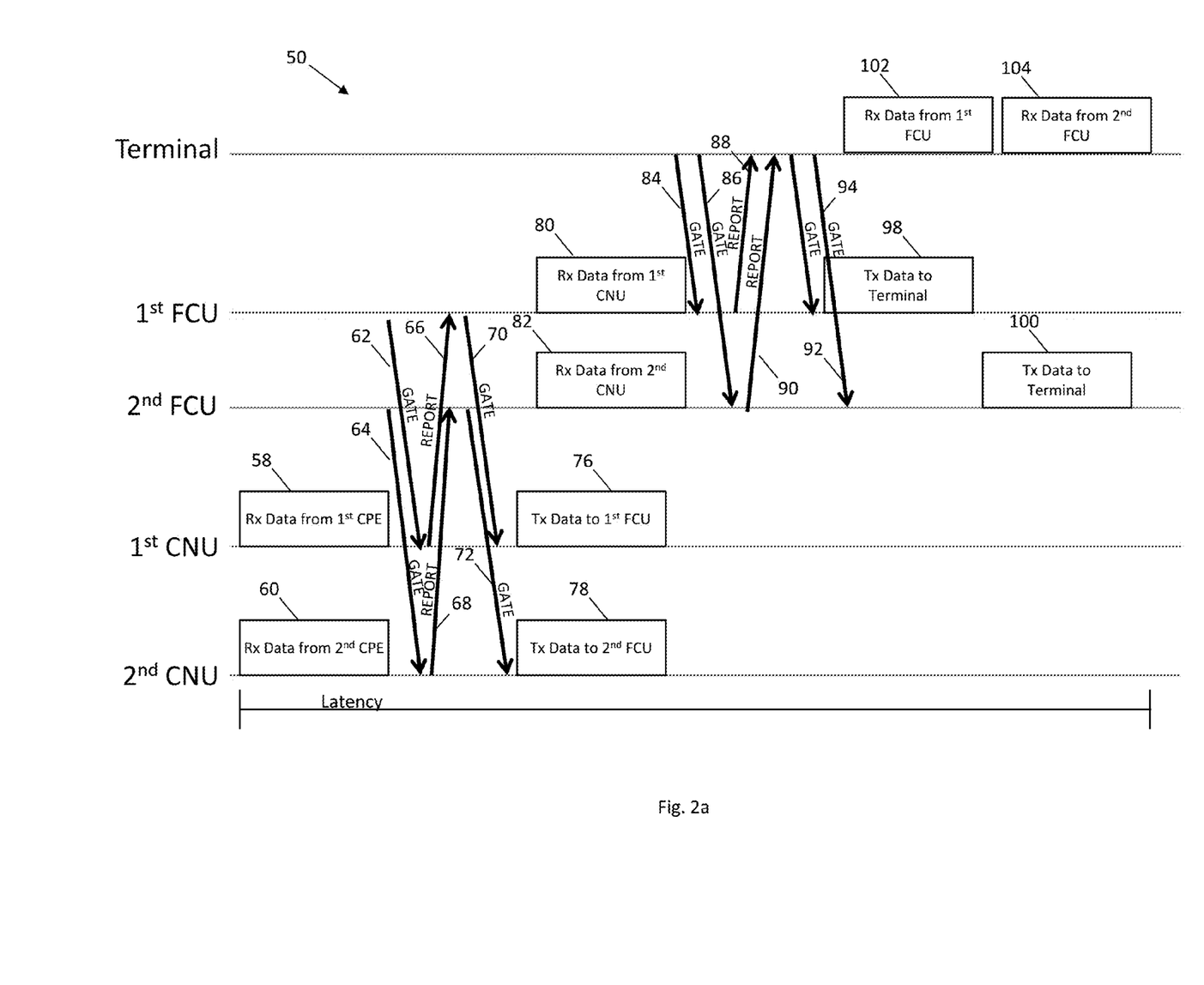
FIGS. 2a-2c illustrate diagrams associated with a method of multi-domain scheduling for subordinate networking in accordance with one non-limiting aspect of the present invention.
Figure 2B:
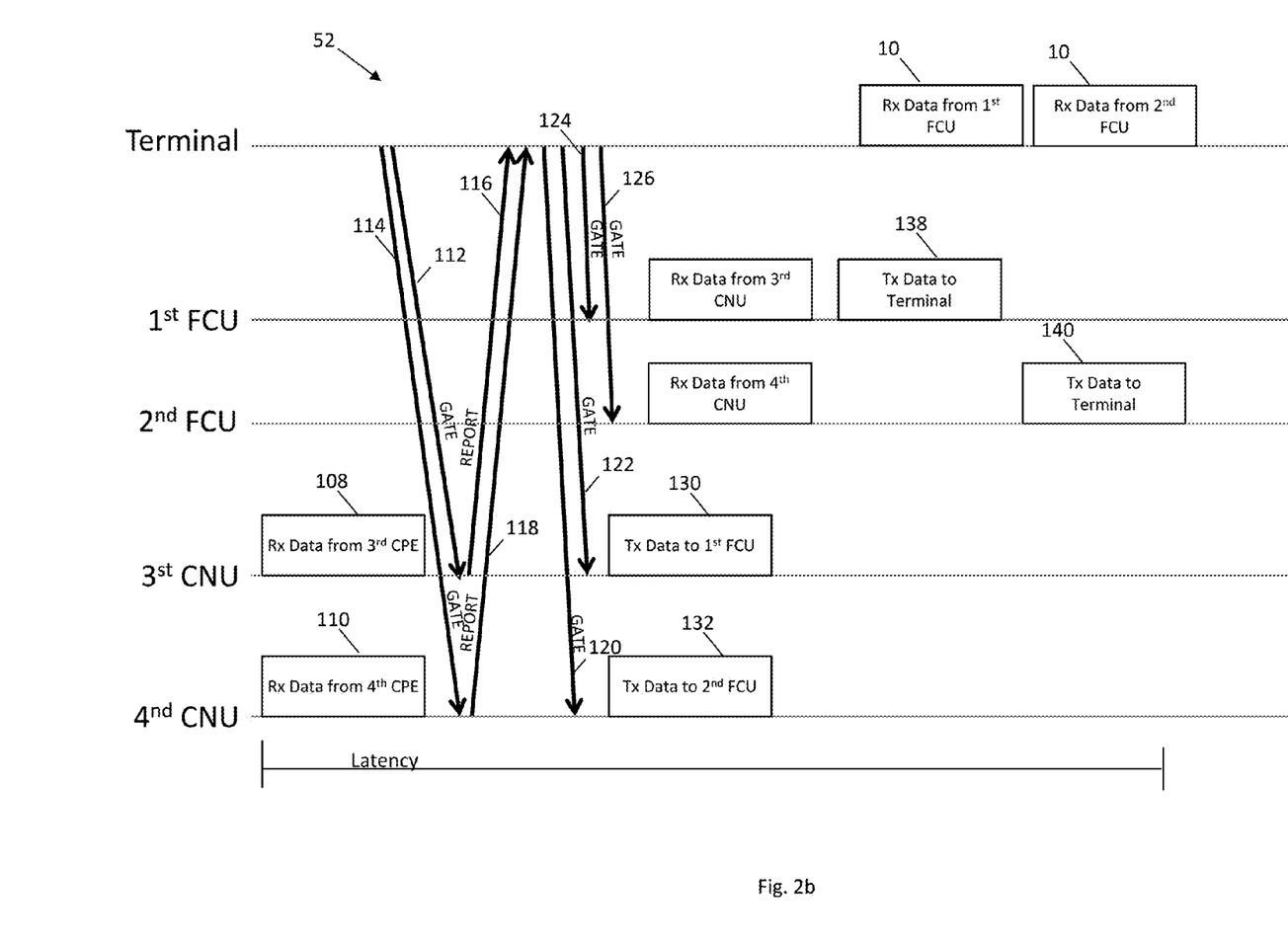
Figure 2C:
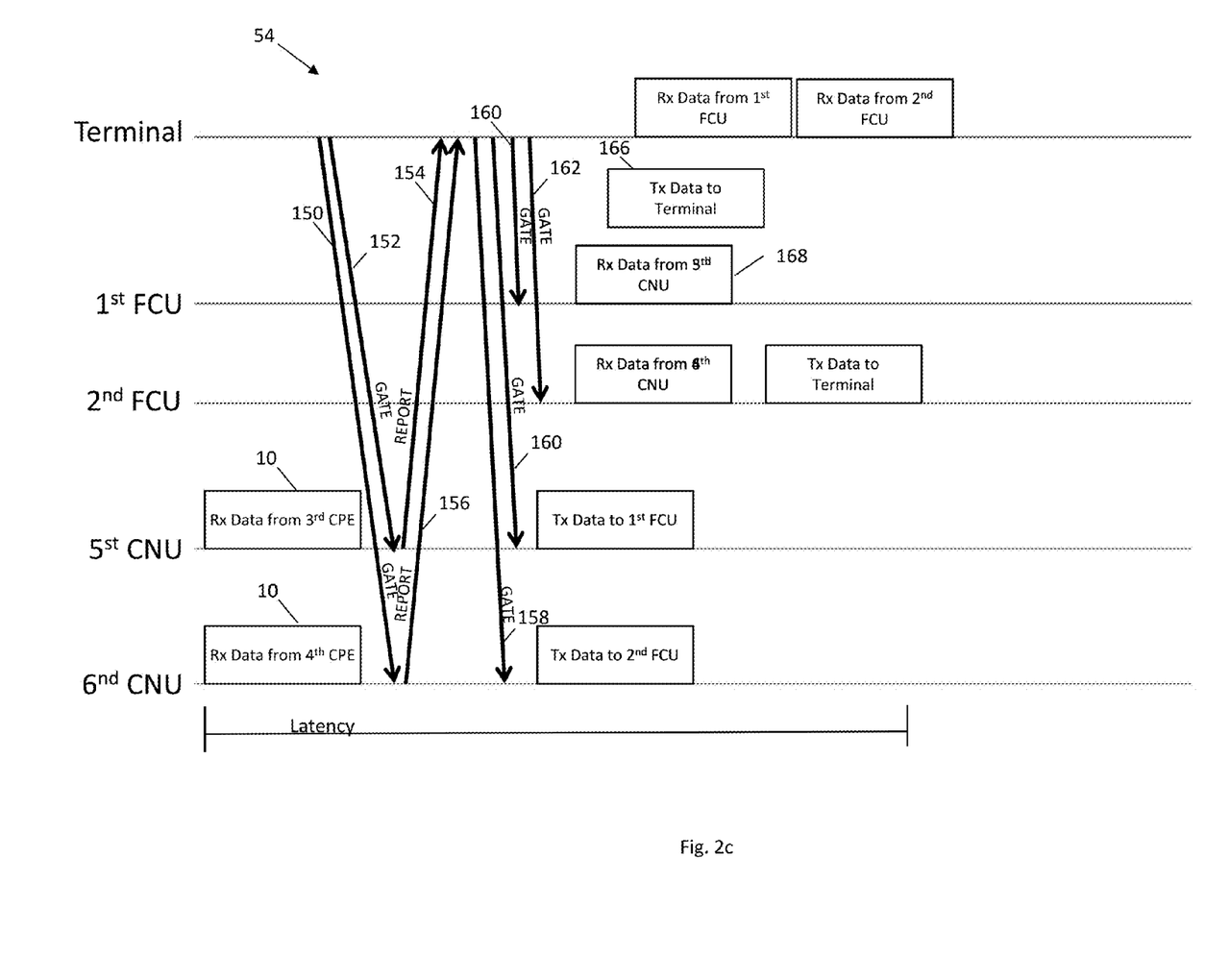

FIGS. 2a-2c illustrate diagrams 50, 52, 54 associated with a method of multi-domain scheduling for subordinate networking in accordance with one non-limiting aspect of the present invention. The scheduler 14 may include a non-transitory computer-readable medium having a plurality of instructions operable with a processor to facilitate the contemplated multi-domain scheduling and/or dynamic bandwidth allocation. The diagrams 50, 52, 54 illustrates an exemplary scenario where a plurality of customer premise equipments (CPEs) or other devices desire scheduling of network resources in order to facilitate transmitting data to the terminal 14 by way of the primary P2MP network 16 and one of the subordinate P2MP networks 18, 20, 22. One or more of the CNUs may be associated with each of the plurality of CPEs to facilitate the desired data transmission, which are assumed to be arranged in pairs, e.g., a first CPE communicates with a first CNU, a second CPE communicate with a second CNU, a third CPE communicates with a third CNU, a fourth CPE communicates with a fourth CNU, a fifth CPE communicates with a fifth CNU and a sixth CPE communicates with a sixth CNU. The paired arrangement of CPEs to CNUs is provided for exemplary non-limiting purposes as multiple CPE may be associated with the same one or more CNUs and vice versa. The multi-domain scheduling generally relates to scheduling data transmit for CPE as a function of dynamically allocating bandwidth or other network transmission constraints.

One non-limiting aspect of the present invention contemplates facilitating the multi-domain scheduling according to the operations and characteristics of PON, including the use of reports to request data transmission and gates to grant/allocate network resources for data transmission. The use of reports/gates is provided for exemplary non-limiting purposes as the present invention fully contemplates its use and application in facilitating other messaging or means for determining a need to allocate network resources for data transmissions and communicating related scheduling instructions to the CPE, FCUs, CNUs, etc. The gates may be issued to indicate a time when a device has been allocate resources sufficient to transmit data or to issue a report, optionally including transmission parameters such as frequency, size, etc. and the reports may be issued to request issuance of a gate. The FIG. 2a diagram 50 begins in Blocks 58, 60 with the first and second CNUs respectively receiving data from first and second CPEs for transmission. The first and second CNUs may have already received or may thereafter receive gates 62, 64 from a corresponding one of the first and second FCUs indicating an opportunity when the first and second CNUs may transmit respective reports 66, 68 to request scheduling of network resources necessary to facilitate transmission of the data received in Blocks 58, 60. The first and second FCUs may responsively issue gates 70, 72 to the first and second CNUs to identify a time when the data should be transmitted.

Blocks 76, 78 relate to the first and second CNUs transmitting the received data in Blocks 58, 60. Blocks 80, 82 relate to the data transmitted from the CNUs being correspondingly received at the first and second FCUs. The first and second FCUs may have already received or may thereafter receive gates 84, 86 from the terminal indicating an opportunity when the first and second FCUs may transmit respective reports 88, 90 to request scheduling of network resources necessary to facilitate further transmission of the data received in Blocks 80, 82 to the terminal. The terminal may responsively issue gates 92, 94 to the first and second FCUs to identify a time when the data should be transmitted, which may be spaced in order to ensure that the data is received at the terminal without conflict. Blocks 98, 100 relate to the first and second FCUs transmitting the data received in Blocks 80, 82 to the terminal. Blocks 102, 104 relate to the terminal correspondingly receiving the data from the FCUs according to the timing set forth in the previous issued gates 92, 94. Unlike the transmission from the CNUs to FCUs in Blocks 76, 78, the transmission of data from the FCUs to the terminal in Blocks 98, 100 may be staggered such that the data is received at the terminal without conflict, e.g., without the terminal simultaneously receiving data from both of the first and second FCUs and/or without the terminal receiving overlapping data from the first and second FCUs.

The scheduling of network resources for the first and second CPE required gates/reports 62, 64, 66, 68, 70, 72 to be exchanged between the first and second CNUs and the first and second FCUs and thereafter gates/reports 84, 86, 88, 90, 92, 94 to be exchanged between the first and second FCUs and the terminal. The gate/reports 84, 86, 88, 90, 92, 94 exchange between the first and second FCUs and the terminal occurred after the exchange of gates/reports 62, 64, 66, 68, 70, 72 between the first and second CNUs and the first and second FCUs. A certain amount of time consequently elapses between when the first and second CPEs initially transmit the data and the data actually being received at the terminal. A resulting latency can be problematic when the transmitted data is of the type requiring rapid transmissions, such as but not necessary limited to video, Voice over Internet Protocol (VoIP) calls, etc. where sufficient amounts of latency can introduce jitter or other disruptive performance. One non-limiting aspect of the present invention contemplates the first and second FCUs or other FCUs within the subordinate networking environment including capabilities to facilitate pass-through reporting. The pass-through reporting may be characterized by the FCUs relaying or otherwise directing gates/reports to the terminal instead of processing the gate/reports for the purposes of performing scheduling or other operations related to issuing gate/reports (e.g., instead of processing and issuing the gate/reports, the FCUs may instead rely upon the terminal to do the same).

The pass-through reporting may be utilized to facilitate decreasing the latency associated with the FCUs processing gates/reports for the CNUs, which may be beneficial in facilitating reduction of jitter and other harmful effects associated with the time delay attendant to the FCUs to processing gate/reports for the CNUs and thereafter repeating a similar exchange with the terminal. The scheduler may facilitate implementation of the FCU pass-through reporting with issuance of instructions sufficient to command the FCUs to engage or otherwise operate according to pass-through settings. Of course, the present invention is not necessary limited to the scheduler or other device instructing the FCUs to implement pass-through reporting and fully contemplates the FCUs being deployed or otherwise configured to facilitate exchanging signals between the primary and subordinate P2MP networks without possessing the capabilities to facilitate issuing and/or processing the gate/reports or the ability to selectively engage and disengage pass-through reporting as a function of received instructions.

FIG. 2b illustrates a diagram 52 of pass-through reporting with non-overlapping transmissions from the FCUs in accordance with one non-limiting aspect of the present invention. The diagram illustrates pass-through processing associated with a third and fourth CPE requesting to transmit data in a manner similar to that above-described with respect to the first and second CPE. The data transmission request from the third and fourth CPE are shown with respect to a similar time scale in order to demonstrate the reduced latency, and while the transmission requests associated with the first, second, third and fourth CPE may occur at the same time, the subordinate networking infrastructure may require the corresponding data transmissions to arrive at the terminal without conflict. As such, while the diagrams appear to be occurring at the same time, the corresponding operations may be staggered in time so as to avoid such a conflict. Blocks 108, 110 relate to the third and four CNUs respectively receiving data desired for transmission from the third and fourth CPEs. The third and fourth CNUs may have already received or may thereafter receive gates 112, 114 from the terminal. The gates 112, 114 may be issued in a pass-through of the first and second FCUs such that they travel from the terminal to the corresponding one of the first and second CNUs without being delayed or processed significantly at the first and second FCUs.

The gates 112, 114 may indicate when the third and fourth CNUs may transmit respective reports 116, 118 to request scheduling of network resources necessary to facilitate transmission of the data received in Blocks 108, 110. The reports 116, 118 may be transmitted through the first and second FCUs in a pass-through report to the terminal so as to eliminate processing delays associated with the first and second FCUs and to assigning scheduling responsibility to the terminal. The terminal may issue gates 120, 122, 124, 126 to the third and fourth CNUs as well as the first and second FCUs to facilitate transmission of the data to the terminal. The gates 120, 122 issued to the third and four CNUs may specify a time when each is to transmit the received data to the corresponding one of the first and second FCUs. The gates 124, 126 issued to the first and second FCUs may specify time when each is to transmit the received data to the terminal. Optionally, the FCU gates 124, 26 may be issued before the third and fourth CNUs begin transmitting the data in Blocks 130, 132 and/or each of the gates 120, 122, 124, 126 may be issued prior to any other reports being issued from the third and four CNUs, i.e., no additional reports may be issued from the third and fourth CNUs during the interval time elapsing from issuance of the initial reports 116, 118 and transmission of the data to the terminal. Blocks 138, 140 relate to the first and second FCUs transmitting the data according to the instructions included in the corresponding gates such that the data arrives without conflict at the terminal.

A latency associated with the third and fourth CPEs initially requesting data transmission and the data eventually reaching the terminal is less with the pass-through reporting than the latency described above with respect to FIG. 2a. This reduction in latency may be beneficial to improving jitter or otherwise enhancing data transmission related operations. One non-limiting aspect of the present invention contemplates further reducing the latency by instructing the FCUs to begin transmitting data prior to completely receiving the data from the corresponding CNU. FIG. 2c illustrates a diagram 54 of enhanced pass-through reporting with overlapping transmissions from the FCUs in accordance with one non-limiting aspect of the present invention. The diagram illustrates pass-through processing where a fifth and sixth CPE request a fifth and sixth CNU to transmit data in the manner similar to that described above with respect to the third and fourth CPE. The corresponding gates and reports 150, 152, 154, 156, 158, 160 may be pass-through the first and second FCUs in the manner described above and acted upon by the terminal in the manner described above to facilitate scheduling data transmission from the CNUs to the FCUs and then with additional gates 162, 162 on to the terminal.

The enhanced pass-through reporting in diagram differs slightly from the diagram in that Block 166 relates to the first FCU beginning to transmit the received data prior to entirely receiving the data in Block 168. Depending on transmission times, propagation delay, etc., the second FCU may be similarly instructed by the terminal to begin transmitting the received data prior to entirely receiving the data as long as the resulting data arrives at the terminal without conflict with the data transmitted from the other FCUs, e.g., if the propagation delay from the second FCU is sufficiently long, the second FCU may begin transmitting data while the first FCU is still transmitting data so long as an entirety of the data from the first FCU reaches the terminal prior to the terminal beginning to receive data from the second FCU. The use of overlapping transmissions from one or more of the FCUs, e.g. the FCUs transmitting data before entirely receiving the data to be transmitted, can further enhance transmissions times by further reducing the latency. This capability may be particularly beneficial with larger file transfers or in environments where propagation delays may vary between the terminal and FCUs within a common primary P2MP network. Optionally, the scheduler may include capabilities sufficient to test or otherwise assessed propagation delays in order to facilitate scheduling overlapping operations of FCUs, and if possible, similarly for the CNUs.

Figure 3:
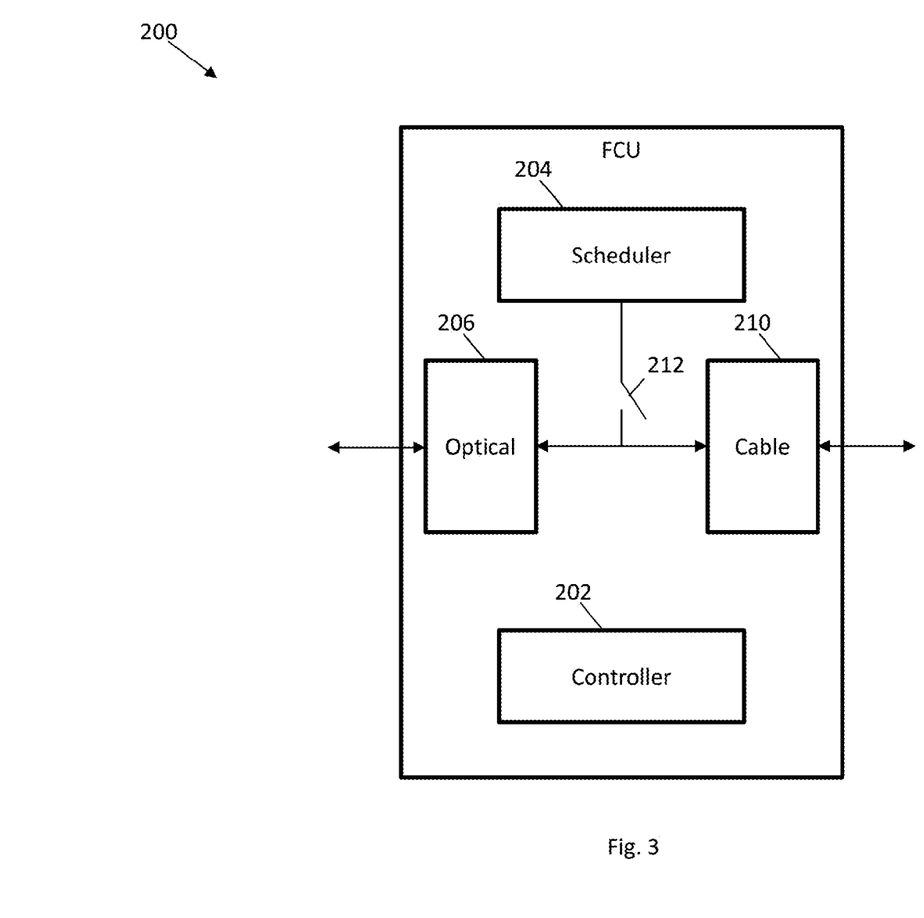
FIG. 3 illustrates an FCU in accordance with one non-limiting aspect of the present invention.

FIG. 3 illustrates an FCU 200 in accordance with one non-limiting aspect of the present invention. The FCU 200 may include a controller 202, a scheduler 204, an optical interface 206 and a cable interface 210. The controller 202 may include a computer-readable medium having a plurality non-transitory instructions sufficient to facilitate controlling the FCU 200 in accordance with the present invention and/or in accordance with various communications standards, including but not limited to EPON, PON and EPoC. The scheduler 204 may operate similarly to the scheduler 24 described above with respect to the terminal in so far as being configured to facilitate processing and/or issuing gates/reports to facilitate the transmissions described above and otherwise associated with facilitating signal transmissions in accordance with the present invention. The scheduler 204 may be responsible for issuing the gates/reports shown in FIG. 2a as being transmitted from the FCUs to the CNUs. A switch 212 is shown to diagrammatically illustrate a capability of FCU 200 to facilitate selectively engaging in disengaging from the contemplated pass-through reporting. While such a switch 212 may not be actually employed to facilitate the engagement and disengagement a pass-through reporting, it is presented for illustrative purposes to demonstrate the capability of the controller 202 to facilitate selectively controlling operation of the scheduler 24 according to instructions received from the terminal schedule or other network controller.

As supported above, one non-limiting aspect of the present invention contemplates reducing latency when scheduling transmissions within EPON networks where ONUs send REPORT messages to the OLT to report the "fullness" of their queues and the OLT, in turn, uses the REPORT messages to allocate upstream bandwidth to the ONU. In the present invention, the OLT dynamically determines the upstream bandwidth requirements of an intermediate Aggregation Device by algorithmically combining the individual REPORT messages from the individual ONUs which are downstream from the Aggregation Device. In accordance with the present invention, the OLT may receive the REPORT messages from ONUs, and with the OLT being aware of the set of ONUs downstream from an Aggregation Device, the OLT can dynamically compute the fullness of the Aggregation Device queues by algorithmically combining the REPORT messages from downstream ONUs. In one embodiment of the invention, the algorithmic combining of REPORT messages from ONUs could simply be the summation of individual ONU queue fullness to provide an overall traffic picture of the P2MP network downstream from the aggregation device. The present invention may alleviate the need for Aggregation Devices to report queue fullness to the OLT and may lead to a simplified and less expensive Aggregation Device and improved network efficiency. In this manner, aspects of the present invention may be utilized to improve efficiency of a network comprised of one or more P2MP networks, and to simplify and reduce costs associated with the aggregation device.

One non-limiting aspect of the present invention contemplates using a single scheduler for the purpose of coordinating transmissions between the various P2MP networks and end devices (e.g., the operations associated with FIG. 2a may be eliminated and the system may operate entirely according to the operations associate with FIGS. 2b and 2c). This may improve overall network efficiency, minimize frame delay and frame delay variation, and simplify the Aggregation Device by alleviating the need for a scheduler on each Aggregation Device. The present invention also includes the notion of Pass-Through Reporting, in which the messages used by end devices to report their upstream bandwidth requirements (REPORT messages sent by ONUs in the case of EPON or EPoC) are "passed through" the aggregation device and consumed only by the centralized multi-domain scheduler. The centralized multi-domain scheduler interprets the REPORT messages from ONUs (in the case of EPON), and using another invention disclosure the multi-domain scheduler can surmise the bandwidth requirements for a particular Aggregation Device. The multi-domain scheduler, armed with information about the ONU bandwidth requirements, as well as requirements for the corresponding Aggregation Devices, can then schedule each device to minimize frame delay across the subordinate P2MP networks, as well as minimize frame delay while resident in the Aggregation Device awaiting upstream transmission across the parent P2MP network. In essence, the multi-domain scheduler is able to schedule the Aggregation Device immediately after the scheduling of the ONUs which are downstream from the Aggregation Device. The OLT may optionally include sending GATE messages with upstream transmission times that are coordinated in time to minimize delay and frame delay variation across the entire network, which also maximizes the use of network resources.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A communication system operable to implement Ethernet Passive Optical Network (EPON) Protocol over Coax (EPoC), the system comprising:
    an optical line terminal (OLT) configured to interface optical signals with a first network;
    a first fiber cable unit (FCU) configured to interface optical signals with the first network and non-optical signals with a second network;
    a second FCU configured to interface optical signals with the first network and non-optical signals with a third network;
    a first plurality of cable network units (CNUs) configured to interface non-optical signals with the second network;
    a second plurality of CNUs configured to interface non-optical signals with the third network; and
    a scheduler configured to schedule transmission of data from the first and second CNUs to the OLT as a function of gates and reports exchanged between the OLT and the first and second CNUs using pass-through reporting, the scheduler including a plurality of non-transitory computer-readable instructions operable with a processor thereof to facilitate scheduling the transmission of data, the non-transitory instructions being sufficient for:
    i) scheduling transmit of a first data from the first FCU to the OLT over the first network and transmit of a second data from the second FCU device to the OLT over the first network such that the first data is completely received before the OLT begins receiving the second data, the first data being transmitted to the first FCU from a first CNU of the first plurality of CNUs and the second data being transmitted to the second FCU from a second CNU of the second plurality of CNUs, including scheduling the transmit of the first data from the first FCU as a function of a first report transmitted from the first CNU and the transmit of the second data from the second FCU as a function of a second report transmitted from the second CNU, the first and second FCUs using pass-through reporting to respectively deliver the first and second reports from the first and second CNUs to the OLT;
    ii) issuing a first gate to the first FCU to schedule the transmit of the first data from the first FCU to the OLT at a first time, the first time occurring after the OLT receives the first report;
    iii) issuing a second gate to the second FCU to schedule the transmit of the second data from the second FCU to the OLT at a second time, the second time occurring after the OLT receives the second report;
    iv) issuing via a pass-through of the first FCU a third gate to the first CNU to schedule transmit of the first data from the first CNU to the first FCU at a third time, the third time occurring prior to the first time; and
    v) issuing via a pass-through of the second FCU a fourth gate to the second CNU to schedule transmit of the second data from the second CNU to the second FCU at a fourth time, the fourth time occurring prior to the second time.

2. The system of claim 1 wherein the pass-through reporting includes the gates and reports exchanged between the OLT and the first and second CNUs passing-through one of the first and second FCUs without being processed.

3. The system of claim 1 wherein the pass-through reporting includes:
the scheduler instructing the first FCU to transmit the first data prior to the first FCU completely receiving the first data; and
the scheduler instructing the second FCU to transmit the second data prior to the second FCU completely receiving the second data.

4. The system of claim 1 wherein the scheduler issues the first, second, third and fourth gates following receipt of the first and second responses and prior to the first FCU beginning to transmit the first data and prior to the second FCU beginning to transmit the second data.

5. The system of claim 4 wherein the scheduler issues the first and second gates such that the first data is completely received at the OLT prior to the OLT beginning to receive the second data.

6. The system of claim 5 wherein the scheduler issues the first and second gates such that the first FCU begins transmitting the first data prior to receiving an entirety of the first data from the first CNU and such that the first data completely arrives at the OLT prior to the terminal beginning to receive the second data.

7. The system of claim 6 wherein the scheduler receives the first and second reports and issues the first, second, third and fourth gates within a first interval of time, the scheduler receiving no reports from the first and second FCUs during the first interval of time.

8. The system of claim 1 further comprising:
a first splitter optically connected between the OLT and the first and second FCU;
a second splitter non-optically connected between the first FCU and the first plurality of CNUs; and
a third splitter non-optically connected between the second FCU and the second plurality of CNUs.

9. The system of claim 8 wherein the first splitter is unpowered and the second and third splitters are powered.

10. A non-transitory computer-readable medium having a plurality of non-transitory instructions operable with a scheduler to facilitate multi-domain scheduling for subordinate networking, the subordinate networking characterized by a terminal interfacing an Internet Protocol (IP) network with a point-to-multipoint (P2MP) network where the P2MP network includes at least a first aggregating device for a first subordinate P2MP network and a second aggregating device for a second subordinate P2MP network, the first aggregating device aggregating data received from one or more of a first plurality of devices connected to the first subordinate P2MP network for transmit over the P2MP network to the terminal and the second aggregating device aggregating data received from one or more of a second plurality to devices connected to the second subordinate P2MP network for transmit over the P2MP network to the terminal, the terminal being unable to simultaneously receive data from both of the first and second aggregating devices over the P2MP network, the non-transitory instructions being sufficient for:
scheduling transmit of a first data from the first aggregating device to the terminal over the P2MP network and transmit of a second data from the second aggregating device to the terminal over the P2MP network such that the first data is completely received before the terminal begins receiving the second data, the first data being transmitted to the first aggregating device from a first device of the first plurality of devices and the second data being transmitted to the second aggregating device from a second device of the second plurality of devices, including scheduling the transmit of the first data from the first aggregating device as a function of a first report transmitted from the first device and the transmit of the second data from the second aggregating device as a function of a second report transmitted from the second device, the first and second aggregating devices using pass-through reporting to respectively deliver the first and second reports from the first and second devices to the terminal;
issuing a first gate to the first aggregating device to schedule the transmit of the first data from the first aggregating device to the terminal at a first time, the first time occurring after the terminal receives the first report;
issuing a second gate to the second aggregating device to schedule the transmit of the second data from the second aggregating device to the terminal at a second time, the second time occurring after the terminal receives the second report;
issuing via a pass-through of the first aggregating device a third gate to the first device to schedule transmit of the first data from the first device to the first aggregating device at a third time, the third time occurring prior to the first time; and
issuing via a pass-through of the second aggregating device a fourth gate to the second device to schedule transmit of the second data from the second device to the second aggregating device at a fourth time, the fourth time occurring prior to the second time.

11. The non-transitory computer-readable medium of claim 10 further comprising instructions sufficient for issuing the first, second, third and fourth gates such that the first, second, third and fourth times occur prior to receiving any reports from the first device and the second device after the first and second reports.

12. The non-transitory computer-readable medium of claim 10 further comprising instructions sufficient for receiving the first and second reports then issuing the third and fourth gates and then issuing the first and second gates.

13. The non-transitory computer-readable medium of claim 10 further comprising instructions sufficient for issuing the first and second gates such that the first aggregating device begins transmitting the first data to the terminal prior to receiving an entirety of the first data from the first device.

14. The non-transitory computer-readable medium of claim 13 further comprising instructions sufficient for issuing the third and fourth gates such that the first and second devices begin transmitting the first and second data to the first and second aggregating devices at approximately the same time.

15. The non-transitory computer-readable medium of claim 10 further comprising providing conversion instructions to the first and second aggregating devices to facilitate transmit of the first and second data to the terminal, the conversion instructions facilitating the first and second aggregating devices receiving the first and second data from the first and second devices over a non-optical communication medium and transmitting the first and second data to the terminal over an optical communication medium.

16. A non-transitory computer-readable medium having a plurality of non-transitory instructions operable with a scheduler to facilitate multi-domain scheduling for subordinate networking, the subordinate networking characterized by a terminal interfacing an Internet Protocol (IP) network with an optical network where the optical network includes at least a first aggregating device for a first subordinate network and a second aggregating device for a second subordinate network, the first aggregating device aggregating data received from one or more of a first plurality of devices connected to the first subordinate network for transmit over the optical network to the terminal and the second aggregating device aggregating data received from one or more of a second plurality to devices connected to the second subordinate network for transmit over the optical network to the terminal, the terminal being unable to simultaneously receive data from both of the first and second aggregating devices over the optical network, the non-transitory instructions being sufficient for:

scheduling transmit of a first data from the first aggregating device to the terminal over the optical network and transmit of a second data from the second aggregating device to the terminal over the optical network such that the first data is completely received before the terminal begins receiving the second data, the first data being transmitted to the first aggregating device from a first device of the first plurality of devices and the second data being transmitted to the second aggregating device from a second device of the second plurality of devices, including scheduling the transmit of the first data from the first aggregating device as a function of a first report transmitted from the first device and the transmit of the second data from the second aggregating device as a function of a second report transmitted from the second device, the first and second aggregating devices using pass-through reporting to respectively deliver the first and second reports from the first and second devices to the terminal;

issuing a first gate to the first aggregating device to schedule the transmit of the first data from the first aggregating device to the terminal at a first time, the first time occurring after the terminal receives the first report;

issuing a second gate to the second aggregating device to schedule the transmit of the second data from the second aggregating device to the terminal at a second time, the second time occurring after the terminal receives the second report;

issuing via a pass-through of the first aggregating device a third gate to the first device to schedule transmit of the first data from the first device to the first aggregating device at a third time, the third time occurring prior to the first time; and issuing via a pass-through of the second aggregating device a fourth gate to the second device to schedule transmit of the second data from the second device to the second aggregating device at a fourth time, the fourth time occurring prior to the second time.

17. The non-transitory computer-readable medium of claim 16 further comprising instructions sufficient for issuing the first, second, third and fourth gates such that the first, second, third and fourth times occur prior to receiving any reports from the first device and the second device after the first and second reports.

18. The non-transitory computer-readable medium of claim 16 further comprising instructions sufficient for receiving the first and second reports then issuing the third and fourth gates and then issuing the first and second gates.

19. The non-transitory computer-readable medium of claim 16 further comprising instructions sufficient for:

issuing the first and second gates such that the first aggregating device begins transmitting the first data to the terminal prior to receiving an entirety of the first data from the first device; and issuing the third and fourth gates such that the first and second devices begin transmitting the first and second data to the first and second aggregating devices at approximately the same time.

20. The non-transitory computer-readable medium of claim 16 further comprising providing conversion instructions to the first and second aggregating devices to facilitate transmit of the first and second data to the terminal, the conversion instructions facilitating the first and second aggregating devices receiving the first and second data from the first and second devices over a non-optical communication medium and transmitting the first and second data to the terminal over the optical network.

* * * * *